April 11, 1939. A. NADAI ET AL 2,154,280
ACCELERATED CREEP TESTING APPARATUS
Filed June 30, 1936 4 Sheets-Sheet 1

WITNESSES:

INVENTORS.
Arpad Nadai and
John Boyd.
BY
Paul E. Friedemann
ATTORNEY

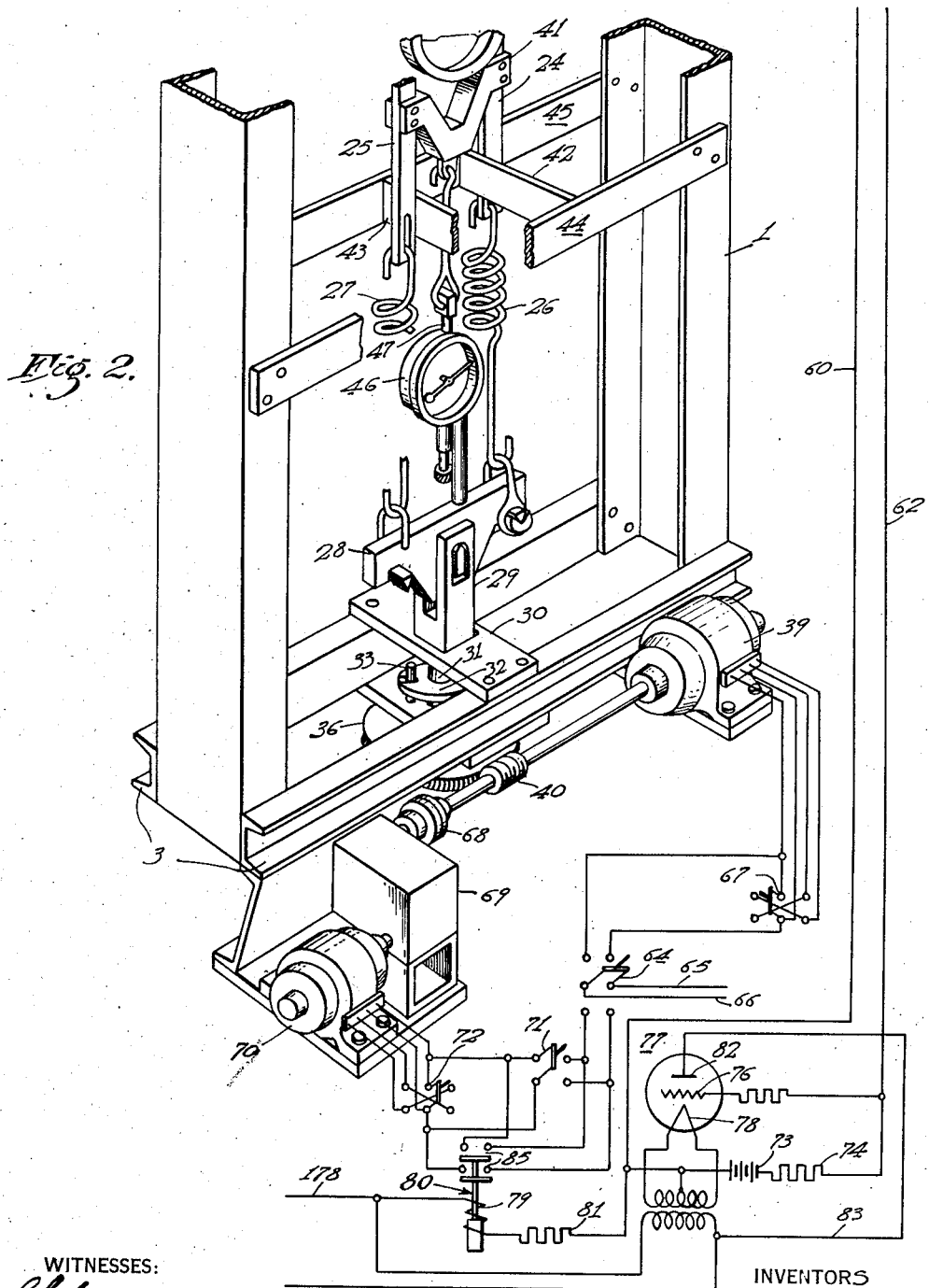

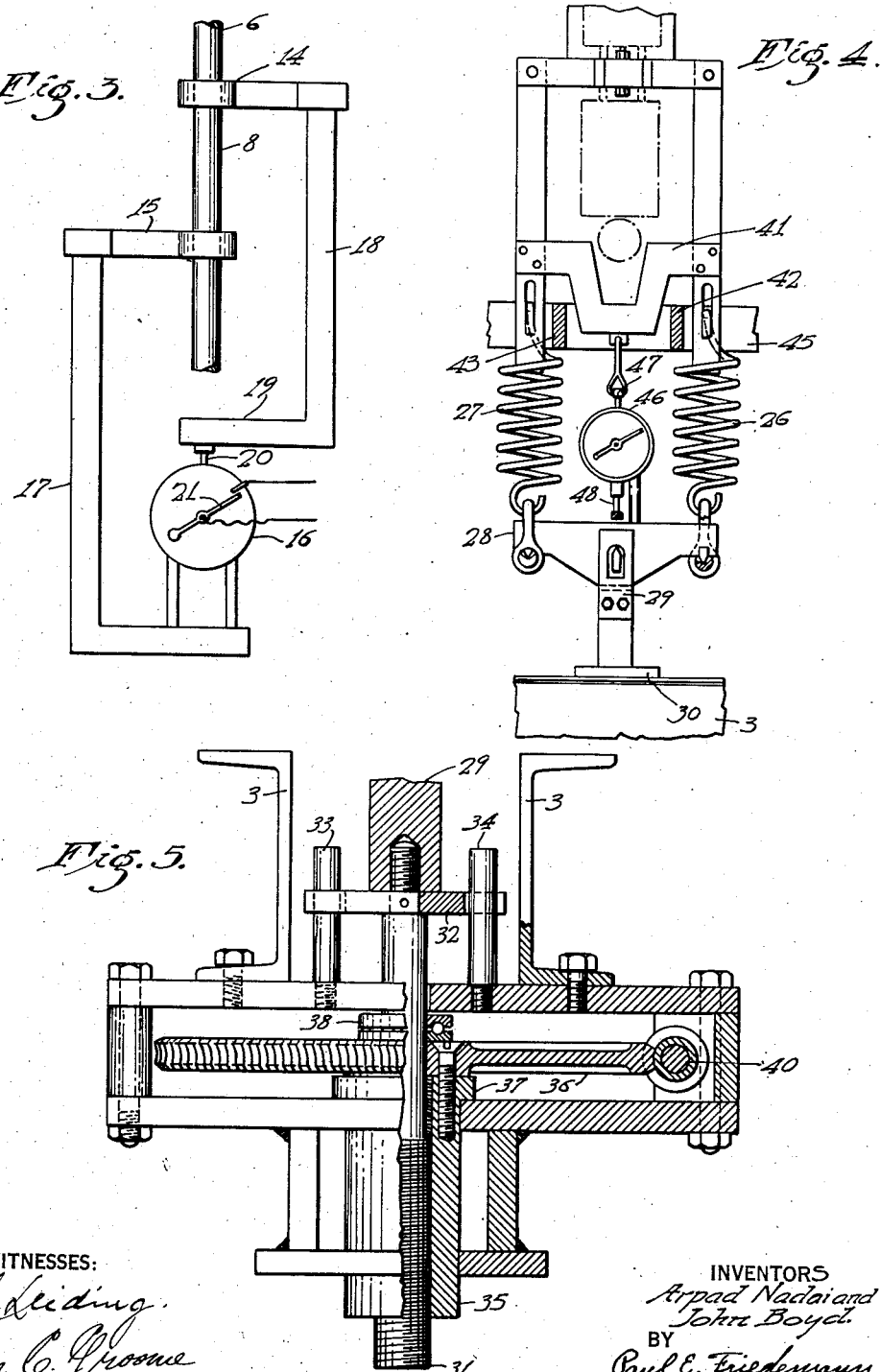

Patented Apr. 11, 1939

2,154,280

UNITED STATES PATENT OFFICE 2,154,280

ACCELERATED CREEP TESTING APPARATUS

Arpad Nadai, Wilkinsburg, and John Boyd, Trafford, Pa., assignors to Westinghouse Electric and Manufacturing Company, East Pittsburgh, Pa., a corporation of Pennsylvania Application June 30, 1936, Serial No. 88,096

18 Claims. (Cl. 265—2)

This invention relates to testing devices and more particularly to devices for automatically measuring the creep of metals when subjected to forces.

Service temperatures of boilers, steam turbines, stills, cracking mills, and other apparatus, are usually permanently relatively high so that the metals used in such apparatus are subjected to forces at a time when also subjected to a high temperature. Metals are known to flow when subjected to forces and such flow is especially pronounced as the temperature of the metal subjected to a force is raised. Metal flow, plastic deformation, or creep, is thus a function of temperature, previous plastic deformation, force, rate of strain, or velocity of deformation, time, cold-work, ageing, and other factors of lesser influence.

The strength of a material at elevated temperatures is thus of primary importance for such apparatus as boilers, cracking mills, stills, boiler tubes, cracking tubes, turbines, etc. A boiler may satisfy all service requirements of a given application at the time it is installed, but some months later, or some years later, the metal used may have crept so much that the strength of the material is impaired and an explosion is the result. Similarly, the blades of a turbine may fit properly and operate properly when first put into service but after some time of use at high temperature there is a sudden failure. The only way to account for the failure is the creep of the metal, which creep, of course, also takes place in the turbine steel casting with the consequent undesirable distortions.

In view of the problems pointed out, it is clear that any development to determine the creep of metals is well worth while. The success of such development, of course, hinges on the discovery of a satisfactory method and apparatus to test, or measure, the creep of metals at high temperatures.

Reliable information on the creep of metals can be obtained by the so-called "long time creep tests" in which a test bar is subjected to tension, being loaded by weights, and the creep is observed from time to time, preferably at equal intervals of time, during three or even more months, while the test bar is held at a substantially constant temperature. Such a method is very tedious and furnishes slow results.

One object of our invention is to provide for automatically measuring the creep of a test piece at a constant temperature.

Another object of our invention is to improve on the "long time creep test" method whereby results can be obtained in much less time.

A still further object of our invention is to automatically measure the creep of a metal at frequent intervals for a relatively short interval of time so that the creep that would take place during a long interval of time may be obtained by analysis, or computation.

It is also a broad object of our invention to determine the creep of a metal by a measurement of the variations in load, with the passage of time, on a test piece at constant temperature and constant elongation.

A further object of our invention is to determine the creep after the lapse of any time interval from a variation of the load for a relatively short time interval while both the temperature and the dimensions of the test piece remain unchanged.

The "long time creep test" may require three to six months but our apparatus and method of procedure reduces the time to but a week or two for results equally as satisfactory. Our method may be termed an exact relaxation method since the dimensional characteristics of the test piece remain unchanged.

Attempts have heretofore been made to determine creep by heating a test piece and maintaining the heated test piece at a constant temperature and subjecting the test piece to an initial relatively heavy load. As the test bar creeps its dimension changes and this change in dimensions changes the load. By observing both the changes in dimensions and the changes in load some information of the actual creep may be determined. The elastic deformation is thus partly transformed into a plastic deformation. Such a method is, however, seriously affected by elasticity of the whole system and ambient temperature changes all but destroy the value of the measurements taken. This is all the more serious since the tests must extend over weeks, and more often over months. The chances of keeping the ambient temperature and the elasticity of the system unchanged are thus rather remote.

Another object of our invention is to provide for determining the creep of a metal by means that do not materially alter the test results by reason of variations in the ambient temperature or variations of the elasticity of parts of the apparatus.

Another method that has been proposed is to subject a test piece to a constant load and as the test piece creeps to change the temperature of the test piece to thus maintain the dimensions constant. This method transforms the thermal expansion to a permanent plastic creep. This method also has the defects of the other prior art method briefly discussed. Both of these prior art methods have the serious defect of testing the material under complicated conditions of a relaxation test.

With our apparatus and the theory of its operation, the test data is secured from test pieces when subjected to comparatively simple conditions. Further, as will become more apparent from the more detailed portion of the specification given hereinafter, our apparatus automatically secures many measurements over a relatively short time interval from which the plastic creep at any time may be inferred readily and with considerable accuracy.

Other objects and advantages will become more apparent from a study of the following more detailed portion of the specification when taken in conjunction with the accompanying drawings, in which:

Figure 1 is a perspective view showing the upper portion of our testing apparatus, whereas;

Fig. 2 is a perspective view showing the lower portion of our testing apparatus;

Fig. 3 shows, certain portions shown in Figs. 1 and 2, schematically to illustrate how the extensometer for controlling certain other apparatus is actuated;

Fig. 4 is a front view of the portion of the test apparatus for indicating the load on the test piece;

Fig. 5 shows the mechanical features, partly in section, of the transmission means for varying the load on the test piece;

Figure 1:
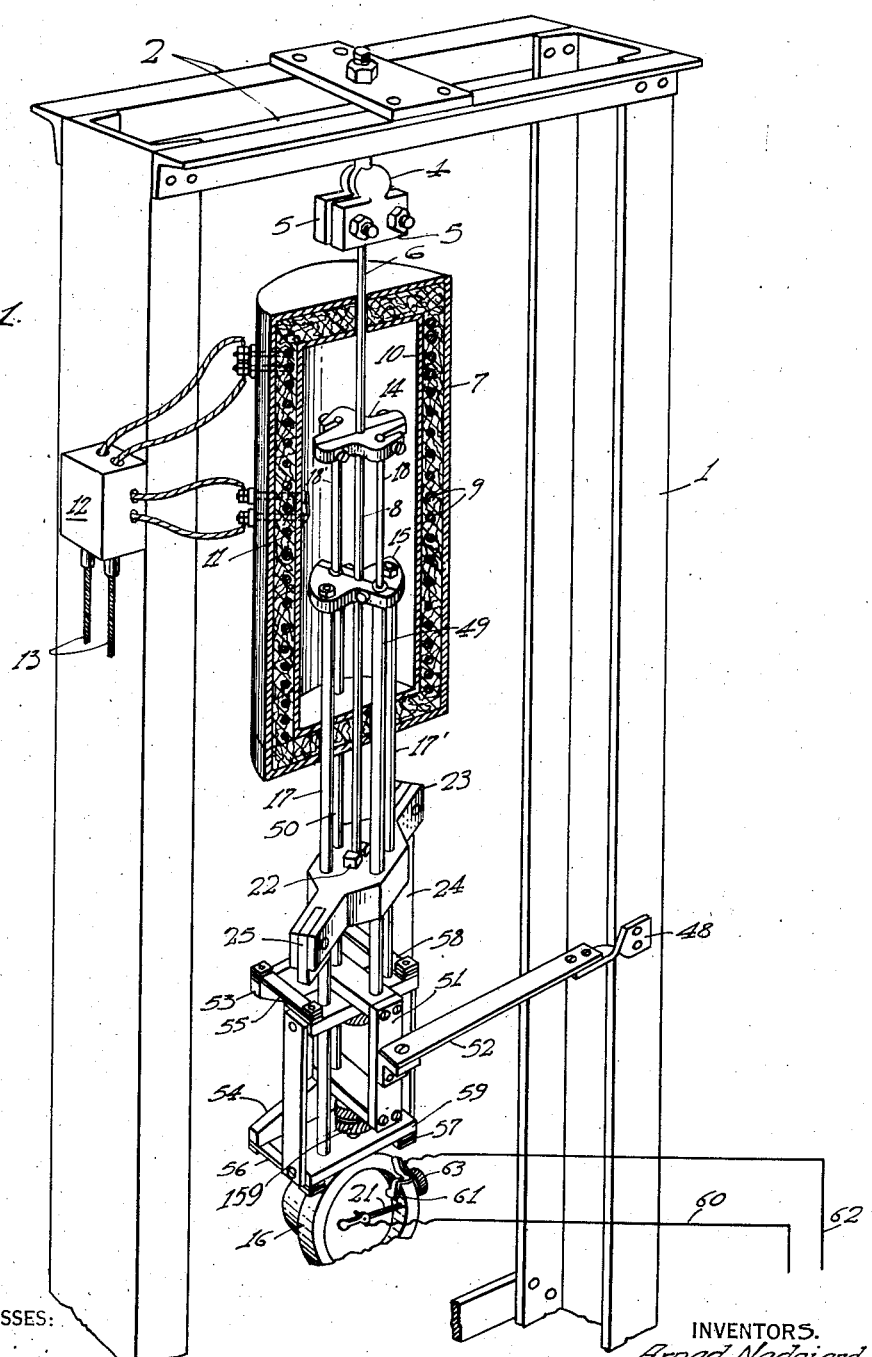

The showing in Figs. 1 and 2 is in part schematic for purposes of clarity. The reference character 1 designates the frame. This frame 1 has the upper horizontal cross-bars 2 and the lower horizontal cross-bars 3. The upper horizontal cross-bars 2 provide a support for a test piece discussed hereinafter. All the parts of the frame structure are built of rather heavy material with reference to the range of dimensions of the test pieces to be tested so that the forces to which a test piece may be subjected do not materially affect the dimensions of the frame, and the test results are thus not materially affected.

The upper horizontal cross-bars 2 are provided with the ball joint connection 4 for the clamping members 5 for securing the upper end of the test piece 6 to the upper cross bars. The test piece 6 is suitably connected, through the test apparatus to be described, between the upper and lower cross-bars so that it may be loaded by subjecting it to tension between the upper cross bars and the lower cross bars.

In order to subject the test piece to any test temperature, an electric furnace 7 is disposed to surround the test length 8 of the test piece. This electric surface is provided with the heating windings 9 disposed adjacent the inner housing 10 and, as will be noted, has its windings concentrated somewhat more at the ends than at the middle, so that uniform temperature may be maintained over the entire length of the test portion 8 of the test piece. The windings, as is usual for electric furnaces of the type shown, are disposed to be non-inductive and in order to control the temperature of the furnace a thermostatic control device 11 is disposed at the mid portion of the furnace and is inter-connected with a control device or regulator 12 for maintaining any selected temperature constant. The electrical energy for the furnace is supplied from a suitable source 13 in any suitable manner which, in itself, constitutes no part of our invention.

The test portion 8 of the test piece 6 is disposed between the clamps 14 and 15 and the creep produced in the test portion of the test piece is indicated by the indicator 16. To actuate the indicator, the arrangements of the rods shown in conjunction with the test portion of the test piece and the lower portion of the electric furnace operate on the principle illustrated more clearly by the schematic showing in Fig. 3.

Assuming that the test portion 8 which may for example be some definite or selected length of wire of the metal to be tested, is disposed between the clamps 14 and 15 rigidly secured to the test piece 6, then, to get an indication of the creep of the test portion of the test piece, the indicator 16 may be rigidly secured to a rod 17 rigidly interconnecting the lower clamp 15 and the indicator 16 and the upper clamp 14 may be rigidly connected to another rod 18 having an indicator actuating element 19 disposed to operate the indicator stem 20.

The apparatus comprising this invention is not limited to the testing of wire. The test pieces may be rods or bars and may have the usual heads including spherical seats.

The arrangement shown in Fig. 3 clearly illustrates that the operation of the pointer 21 of the indicator 16 is made independent of any longitudinal motion of the entire test piece, since both rods 17 and 18 move with the longitudinal movements of the test piece so that the indication or the operation of pointer 21 is dependent only upon a change in dimension between the clamps 14 and 15, namely, a change of dimension of the test portion of the test piece.

To further eliminate any differential effect of the movement of clamps 14 and 15 by reason of the unequal expansions or contractions of bars 17 and 18, these bars are selected of the stock of the test piece and are machined, or otherwise, operated upon to have the same cross-sectional dimensions and sectional shape as the test piece. In other words, the actuating members for the indicator correspond in kind and dimensional characteristics to the material being tested.

In Fig. 1, rods 18 and 18' correspond to the rod 18 shown schematically in Fig. 3, whereas rods 17 and 17' in Fig. 1 correspond to the rod 17 shown schematically in Fig. 3.

The test piece 6 extends through the lower portion of the furnace 7 into the clamping jaws 22 of the beam 23. This beam 23 has a pair of vertical tension members 24 and 25 pivotally secured at its ends. These vertical tension members 24 and 25 are pivotally connected to a pair of relatively heavy yet soft springs 26 and 27 which are, in turn, connected to the pivotally mounted equalizing beam 28. Parts of the vertical tension members and the springs, as well as the connections of the springs to the equalizing beam 28 are broken away to more clearly show some of the other features of our apparatus.

The beam 28 through knife edged trunnions, is secured to the vertically movable tension member or support 29 passing through the plate 30 mounted on the lower cross-bars 3. The tension member 29 may also very appropriately be designated a support because it does, through the springs 26 and 27 and the elements connected to the spring 26 and 27, provide a support for the test piece 6. The tension member 29 has a threaded rod 31 secured to its lower end in a manner shown more clearly in Fig. 5. It will be noted that tension member 29 is threaded onto the rod 31 and has a plate 32 disposed between the rod 31 and tension member 29, which plate 32 has apertures for engaging a pair of guide posts 33 and 34.

The threads of the rod 31 engage threadedly a sleeve 35 rigidly secured to the worm wheel 36. This worm wheel 36 is held in the given position on the frame structure by the shoulder 37 on the sleeve 35 and by the roller thrust bearing 38 disposed above the worm wheel. It is clear that by rotating the worm wheel, the vertical tension member or support 29 may be moved up or down, as desired, and since this member acts on the springs 26 and 27 through the equalizing beam 28 and through the vertical tension members 24 and 25 on the beam 23, the tension on the test piece may be varied at will.

In our apparatus, the tension on the test piece is automatically varied by means of the motor 70 driving the worm 40 which meshes with the worm wheel 36.

The vertical tension members 24 and 25 are provided with a rigidly connected cross beam 41. This cross beam 41 is disposed below the indicator 16 and is constructed in the manner shown best in Figs. 2 and 4. The cross beam 41 is positioned above the struts 42 and 43 rigidly secured to the beams 44 and 45 which are in turn rigidly secured to the vertical members of the main frame 1. The purpose of this structure is to secure safety for the instruments in case of failure of the test piece.

It will be noted that if the tension on the test piece is excessive or for any reason there is a defect in the material, or the test is conducted until the test piece has crept to the point where it can no longer support the minimum load to which it may be subjected during the test, it may break, in which case the support for the indicator 16 would tend to drop without being supported in any manner; the dropping being produced even more forcibly by the action of the springs 26 and 27 which will naturally be under considerable tension. When such failure occurs, the cross beam 41 merely drops on the struts 42 and 43 and no damage is done to any portion of the test apparatus.

Disposed between the cross beam 41 and the equalizing beam 28 is a load indicator 46. The indicator 46 may be mounted adjustably in a vertical direction on the equalizing beam 28 and may have its actuating plunger 47 engage the mid-portion of the cross beam 41. This load indicator, which is nothing more than a conventional micrometer of well known construction is calibrated in units of weight. By adjusting the micrometer on the equalizing beam 28 when the test piece is subjected to a known maximum tension, namely subjected to a predetermined initial stretch, the indicator 46 may be so positioned and adjusted that it will indicate the exact load on the test piece and as the load decreases during the operation which will be explained more in detail hereinafter, the indication will be directly in terms of pounds of load or if very heavy test pieces and a very heavy apparatus were used would read directly in tons of load.

Referring again to Fig. 1, it will be noted that rods 18 and 18' terminate into rods 49 and 50, which rods pass freely through openings in the lower clamp 15. The rods 18 and 18' and the rods 49 and 50 extend through openings in the beam 23 and are rigidly secured to the rectangular frame structure 51. This frame structure 51 is held in the proper position with reference to the test piece by the flat spring 52 elastically secured to the vertical portion of the main frame 1 at 48. It will be noted that the rectangular frame structure 51 may move freely in a vertical direction, but is restrained from any rotative movement about the test piece. The rectangular frame structure 51 has a pair of cross members 53 and 54 connected at one side and these cross members carry a plurality of flat springs 55, 56, 57 and 58 which hold a second rectangular frame structure 59. The rectangular frame structure 51 corresponds to the indicator plunger actuating arm 19 in Fig. 3, whereas the lower member of the rectangular frame structure 59 constitutes a support for the indicator 16. The plunger of the indicator 16 extends through an opening in the lower portion of the rectangular frame 59 and is adapted to engage the frame 51.

It will thus be apparent that any variations in dimension of the test portion 8 of the test piece 6 by reason of the creep of the metal or by the initial stress to which it may be subjected will cause a relative movement in the vertical direction of the frame structures 51 and 59 to thus operate the indicator 16.

The springs 55, 56, 57 and 58 permit such relative vertical movement and yet maintain all of the actuating parts in proper relative position and spring 52 permits vertical movement of both frame structures 51 and 59 and the gauge mounted on the frame structure 59 yet maintains the gauge or indicator 16 and its actuating members in proper relation to the loading means for the test piece.

The indicator 16 is provided with a pointer 21 which is connected to one conductor 60 of an electric circuit and is adapted to coact with a contact member 61 connected to another conductor 62 of an electric circuit for controlling the operation of the motor 70. The contact member 61 has a contact retrieving adjusting screw 63 whereby the contact may be shifted out of the way when desired. Adjustment of the relation of pointer 21 and contact 61 is accomplished by the knurled nuts 159 shown just above member 59.

A better understanding can probably be had from a study of the sequence of operation of our apparatus for a typical test on a test piece the creep of which is to be determined at a given temperature. After connection of the test piece into the apparatus, which will be obvious to any skilled attendant, the regulator 12 is adjusted for the particular temperature at which the test is to be conducted and this regulator thereafter through the action of the thermostatic device 11 maintains the temperature of the test piece and particularly the test portion 8 at a selected constant temperature. To subject the test piece to an initial stretch or deformation, the attendant actuates switch 64 to the uppermost position.

When the switch 64 is disposed in the uppermost position, a circuit is established from the direct current buses 65 and 66 to operate the motor 39. A reversing switch 67 is also disposed in the energizing circuit for motor 39 so that motor 39 may be caused to operate to either load the test piece 6 or to unload it depending upon whether the attendant is beginning the test or has completed his test.

At the beginning of the test motor 39 will be caused to operate in such a direction as to load the test piece by the operation of the worm wheel 36 through worm 40 in such a direction as to subject the springs 26 and 27 to more and more tension. The shaft of the worm gear 40 also extends to the clutch 68. This clutch is an over-running clutch and does not act on the reduction gear system 69 nor the motor 70.

When the test piece has been subjected nearly to an initial distortion or deformation of a desired selected value, namely when it has been subjected to a predetermined load for the temperature at which the test is to be conducted, the switch 64 is moved to the lowermost position. If the adjustment or the loading effected by the motor 39 was not sufficiently accurate then the attendant may close switches 71 and 72 to operate the motor 70 to further load the test piece.

The motor 70 operates through a reduction gear system 69 and, therefore, causes only a very small change in load for each operation, that is, a very small change of load is effected for a given rotation or fraction of a rotation of the armature of motor 70.

When the loading of the test piece is exactly of the value desired, the switch 71 may be opened and the indicator is shifted so that the contact member 61 of the indicator 16 is shifted with reference to the pointer 21 if the load on the test piece is decreased by a very small fraction. Opening of the switch 71, of course, stops the motor 70 and since the test piece is loaded, it will begin to creep and after it has changed its dimensions by plastic flow or creep, the pointer 21 will make contact with the contact member 61 thereupon establishing a circuit from the right hand terminal of the battery 73 through resistor 74, conductor 62, contact member 61, pointer 21 and conductor 60, to the left hand terminal of the battery 73. The battery is so connected with reference to the grid 76 of the electric discharge device 77 as to put a predetermined potential bias on the grid with reference to the cathode 78. When the pointer 21 makes contact with the contact member 61, the bias of the grid 76 is changed so that the electric discharge device 77 breaks down thereby causing a flow of current from bus 178 through actuating coil 79 of the contactor 80, the resistor 81, the cathode 78 of the discharge device 77, an anode 82 and conductor 83 to the bus 84. The contactor 80 will thus be operated and in consequence the contact members 85 close, thereby energizing the motor 70. This motor, in view of the proper position of switch 72, operates in such a direction as to decrease the loading on the test piece, that is, worm wheel 36 is operated by the worm 40 to relieve the tension on the test piece.

As the tension is relieved, the pointer 21 will disengage the contact member 61 thereby causing a deenergization of the contactor 80 and in consequence the motor 70 stops. As soon as the test portion 8 of the test piece has again changed its dimension by reason of its creeping action or plastic deformation, motor 70 will be again energized to relieve the load on the test piece. The adjustment of the contact member 61 may, of course, be such that but a small deformation of the test portion 8 of the test piece will cause the motor 70 to operate. In practice, the motor will be caused to operate each time the dimension of the test portion of the test piece has changed a predetermined amount, whereupon the load on the test piece is reduced sufficiently to re-establish the original dimensions of the test piece 8. In other words, the elongation is kept constant and the temperature is kept constant and the load is measured. The time of such load variation is determined by the frequency with which the test piece 8 tends to change its dimensions a predetermined amount. The motor 70 will thus be caused to operate, not at equal intervals of time, but each time equal small deformations occur in the test portion of the test piece.

Figure 6:
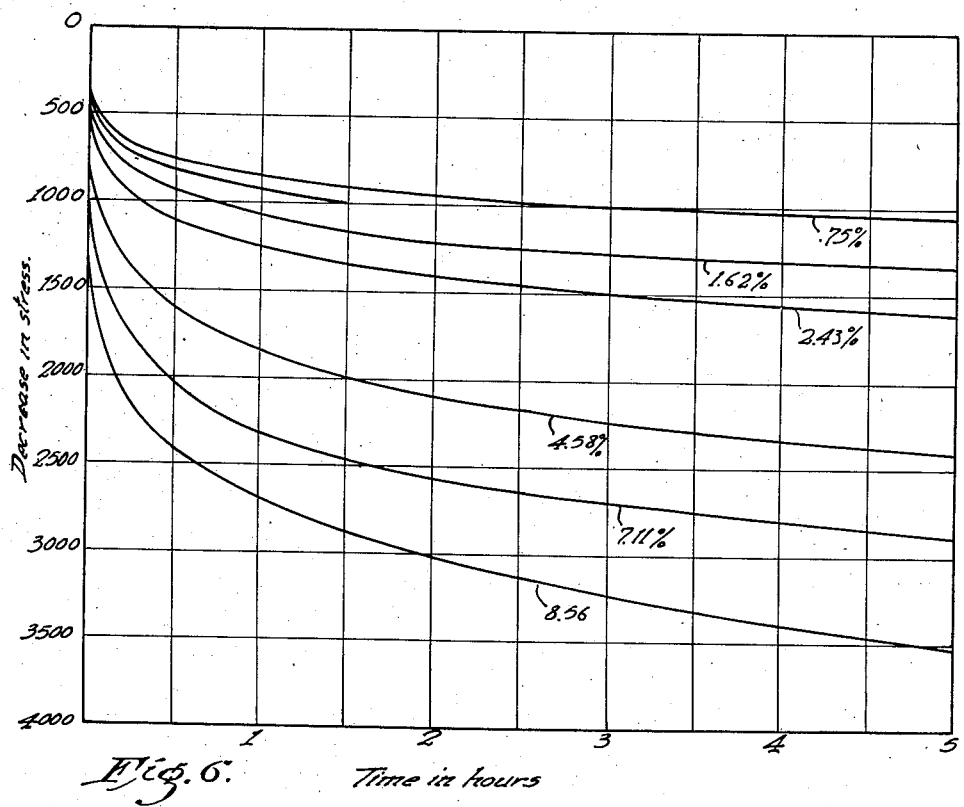
Fig. 6 shows a plurality of curves showing the plastic flow of metal particularly a given test piece of copper.

Fig. 6 illustrates a plurality of curves secured from the tests of a copper rod of predetermined dimensions subjected to different initial deformations and tested at a relatively low constant temperature, such as room temperature. The ordinates indicate decrease in stress whereas the abscissae indicate time in hours. It will be noted that the equal deformations occur rather rapidly at the beginning of the test so that the load decreases rapidly. However, as time advances, more and more time is necessary before the test piece creeps a given amount. The uppermost curve represents an initial deformation or change in dimension by "work hardening" or prestretching of .75% and the successive curves represent successive deformations of 1.62%, 2.43%, 4.58%, 7.11% and 8.56%, respectively. These curves, as to general shape, are more or less representative of metals generally. Copper is known to be one of the more plastic metals so that the general shape of the curves illustrating the flow characteristics of metals may be secured in a comparatively short interval of time, namely within an interval of one eight-hour workingday. If boiler plate stock is to be tested, it is, of course, clear that the curve will look somewhat different and representative results could probably not be secured in less than a week. When testing steel and its alloys, results can be secured within a week or at the most a few weeks that are satisfactory for determining the flow of the metal after the lapse of several years. Such information is obviously very valuable. Furthermore, an apparatus of the character we have disclosed, and the method of procedure we follow is very much more valuable than a method of procedure that requires tedious work for a period of three to six months for an investigation of a single test piece.

To secure the points for the curves such as are illustrated in Fig. 6, it is necessary to observe the time of the operation of the motor 70 with reference to the starting of the test run.

Figure 7:
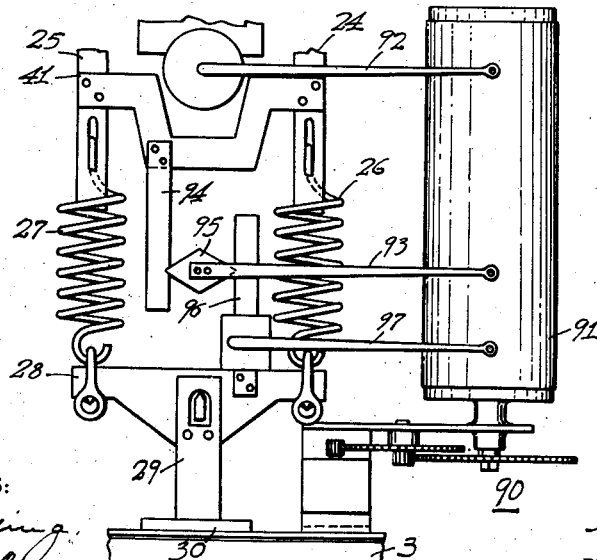
Fig. 7 illustrates a recording apparatus for automatically recording the results secured with our apparatus.

Fig. 7 illustrates a recording device for recording the results of a test, for instance, a clock mechanism such as 90, which may be an electric clock, is geared to a drum 91 carrying a strip of paper which is marked in hours or days or in days, hours and minutes along one edge. The pointer 92 is simply a pointer connected on the shaft of pointer 21 and is positioned to engage the record sheet on the drum 91. The pointer 93 corresponds to the pointer of the indicator 46 and records the variations in load as time passes. The pointer 93 is arranged to be actuated somewhat differently than the pointer of indicator 46. The cross bar 41 in this instance is provided with a depending arm 94 engaging the diamond shaped member 95 at one of the corners whereas the balancing beam 28 carries an upwardly projecting arm 96 engaging the other corner of the diamond shaped member 95. Variations of load thus cause a relatively vertical movement of the members 94 and 96 and, through the connection shown, multiply such movement through the pointer 93. The pointer 97 is merely a stationary member or pointer for providing a reference line both as to time of operation and to the initial loading on the test piece.

This invention is also very adaptable to the exercise of the methods of testing materials heretofore utilized, and in such a use, is much more convenient than apparatus heretofore known and is also adaptable for use over a greater range of creep. For instance, the indicator 46 in Fig. 2, which indicates the load, may readily be provided with a contact arrangement such as shown with the indicator 16. In fact, the only change that would be necessary is to shift the connection of conductors 60 and 62 to the indicator 46.

With such change, any variations in the load on the test piece would start and stop the motor controlling the load on the test piece so that the load would be maintained constant. With this arrangement or method of procedure, the dimensions of the test piece would, of course, vary, whereas the load would be maintained constant. The curve resulting from such a test would not be like the curve shown in Fig. 6, but time would still be indicated on the abscissa, whereas the ordinates would indicate deformations of the test piece. Of course, the disadvantage of having to conduct the test over a long period of time would still obtain.

It is, of course, apparent that others skilled in the art, particularly after they have had the benefit of the teachings of this invention, can devise other apparatus for accomplishing this same result that is accomplished with this apparatus. This invention is, therefore, not to be limited to the particular apparatus herein disclosed but is to be limited only to the scope of the claims hereto appended and the pertinent prior art.

We claim as our invention:

1. In a device for determining the plastic flow, or creep, of a material, in combination, means for subjecting a test piece to a constant temperature, means for subjecting the test piece to a deforming force, and means, responsive to the creep of the material, adapted to change the deforming force to maintain the dimensions of the test piece constant.

2. In a device for determining the plastic flow, or creep, of a material, in combination, means for subjecting a test piece to a constant temperature, means for subjecting the test piece to a deforming force, means, responsive to the creep of the material, adapted to change the deforming force to maintain the dimensions of the test piece constant, and means for indicating the variations in deforming force.

3. In a device for determining the plastic flow, or creep, of a material, in combination, means for subjecting a test piece to a constant temperature, means for subjecting the test piece to a deforming force, means, responsive to the creep of the material, adapted to change the deforming force to maintain the dimensions of the test piece constant, means for indicating the variations in deforming force, and means for recording both the time of change of the deforming force and the deforming force at such time.

4. In a device for determining the plastic flow, or creep, of a material, in combination, means for subjecting a test piece to a constant temperature, means for subjecting the test piece to a deforming force, means, responsive to the creep of the material, adapted to change the deforming force to maintain the dimension of the test piece constant, and means, for recording the times of the changes of the deforming forces and the deforming forces at such respective times, for a given time.

5. The method of determining the plastic flow, or creep, of a metal, including the acts of procedure, or steps, of subjecting the test piece to a constant temperature, subjecting the test piece to a deforming force, varying the deforming force to maintain the dimensions of the test piece constant, observing the time of such variations of force with reference to the beginning of the test, namely, with reference to the time at which the test piece is first subjected to a deforming force, continuing such observations for a given period, and by means of analysis determining the results for a much longer period.

6. The method of determining the plastic flow, or creep, of a metal, including the acts of procedure or steps of subjecting a test piece to a constant temperature, subjecting the test piece to a deforming force, varying the force to maintain the dimensions of the test piece substantially constant, and observing the variations of the force being varied with reference to time.

7. In a device for determining the plastic flow, or creep, of materials, in combination, means for subjecting a test piece having a given length to a constant temperature, means for rigidly connecting the ends of test piece to a pair of relatively movable connecting points, means for relatively moving said connecting points to thus subject the test piece to tension, and means, responsive to a relatively small substantially constant value of creep of a given length of the material subjected to the constant temperature, adapted to control the means for causing the relative movement of said connecting points to thus change the tension in the test piece to maintain the overall length of that portion of the test piece subjected to constant temperature substantially constant.

8. In a device for determining the plastic flow, or creep, of materials, in combination, means for subjecting a test piece to a constant temperature, means for mounting the test piece between a pair of relatively movable connecting points, means for relatively moving said connecting points to thus subject the test piece to tension, means, responsive to relatively small substantially constant values of creep of a given length of the material subjected to the constant temperature, adapted to control the means for causing the relative movement of said connecting points to change the tension in the test piece as a function of the said substantially constant values of creep to maintain the length of the test piece substantially constant, and means for indicating the amount of relative movement of the connecting points.

9. In a device for determining the plastic flow, or creep, of materials, in combination, means for subjecting a test piece to a constant temperature, means for mounting the test piece between a pair of relatively movable connecting points, means for relatively moving said connecting points to thus subject the test piece to tension, means, responsive to given values of creep of a given length of the material subjected to the constant temperature, adapted to control the means for causing the relative movement of said connecting points to thus change the tension in the test piece as a function of the said given values of creep to maintain the length of the test piece substantially constant, means for indicating the amount of relative movement of the connecting points, and means for recording both the time of change of the tension in the test piece and the amount of such relative movement of said connecting points at the times the tension is changed.

10. In a device for determining the plastic flow, or creep, of materials, in combination, means for subjecting a test piece to a constant temperature, means for mounting the test piece between a pair of relatively movable connecting points, means for relatively moving said connecting points to thus subject the test piece to tension, means, responsive to successive substantially equal values of creep of a given length of the material subjected to the constant temperature, adapted to control the means for causing the relative movement of said connecting points to change the tension in the test piece to maintain its length constant, and means, for recording the times of the changes of the tension in the test piece and the magnitude of various changes in relative movement of said connecting points at the respective times the tension is changed.

11. In a device for determining the plastic flow, or creep, of materials, in combination, means for subjecting a test piece to a constant temperature, means for mounting the test piece between a pair of relatively movable connecting points, means for relatively moving said connecting points to thus subject the test piece to a deforming force, and means, responsive to the creep of a given portion of the material subjected to the constant temperature, adapted to control the means for causing the relative movement of said connecting points to thus change the deforming force acting on the test piece to maintain the dimensions of the test piece substantially constant.

12. In a device for determining the plastic flow, or creep, of materials, in combination, means for subjecting the test piece to a constant temperature, means for mounting the test piece between a pair of relatively movable connecting points, means for relatively moving said connecting points to thus subject the test piece to a deforming force, means, responsive to the creep of a given portion of the material subjected to constant temperature, adapted to control the means for causing the relative movement of said connecting points to thus change the deforming force acting upon the test piece to maintain the dimensions of the test piece substantially constant, and means for indicating the amount of relative movement of the connecting points.

13. In a device for determining the plastic flow, or creep, of materials, in combination, means for mounting the test piece between a pair of relatively movable connecting points, means for subjecting a given portion of the test piece to a constant temperature, means for relatively moving said connecting points to thus subject the test piece to a deforming force, means, responsive to successive substantially equal values of creep of the said given portion of the test piece subjected to the constant temperature, adapted to control the means for causing the relative movement of said connecting points to thus change the magnitude of the deforming force acting upon the test piece to maintain the length of the said given portion of the test piece subjected to the constant temperature substantially constant, means for indicating the amount of relative movement of the connecting points, and means for recording both the time of change of the deforming force acting on the test piece and the amount of such relative movement of said connecting points at the time the deforming force is changed.

14. In a device for determining the plastic flow, or creep, of materials, in combination, means for subjecting a test piece to a constant temperature, means for mounting the test piece between a pair of relatively movable connecting points, means for relatively moving said connecting points to thus subject the test piece to a deforming force, means, responsive to successive substantially equal values of creep of a given portion of the material subjected to the constant temperature, adapted to control the means for causing the relative movement of said connecting points to thus change the magnitude of the deforming force acting on the test piece to maintain the length of the test piece substantially constant, and means, for recording the times of the changes of the deforming force acting on the test piece and the magnitude of the various changes in relative movement of said connecting points at the respective times the deforming force is changed.

15. In apparatus for determining the plastic flow, or creep, of metals, in combination, a pair of supports, resilient means connected at one end to one support and at the other end to one end of a test piece, means for connecting the other end of the test piece to the other support, means for moving the supports relative to each other so that said test piece is subjected to a predetermined tension and the test piece will thus have a predetermined length, and means, responsive to successive relatively small values of creep of the test piece, adapted to automatically decrease the distance between said supports so as to maintain the length of the test piece constant.

16. In apparatus for determining the plastic flow, or creep, of metals, in combination, a pair of supports, resilient means connected at one end to one support and at the other end to one end of a test piece, means for connecting the other end of the test piece to the other support, means for moving the supports relative to each other so that said test piece is subjected to a predetermined tension and the test piece will thus have a predetermined length, means for maintaining the test piece at a constant temperature, and means, responsive to successive relatively small values of creep of the test piece, adapted to automatically decrease the distance between said supports so as to maintain the length of the test piece constant.

17. In apparatus for determining the plastic flow, or creep, of metals, in combination, a pair of supports, resilient means connected at one end to one support and at the other end to one end of a test piece, means for connecting the other end of the test piece to the other support, means for moving the supports relative to each other so that said test piece is subjected to a predetermined tension and the test piece will thus have a predetermined length, and means, responsive to successive relatively small values of creep of the test piece, adapted to automatically decrease the distance between said supports so as to maintain the length of the test piece constant and means for indicating the decrease in tension in said resilient means.

18. In apparatus for determining the plastic flow, or creep, of metals, in combination, a pair of supports, resilient means connected at one end to one support and at the other end to one end of a test piece, means for connecting the other end of the test piece to the other support, means for moving the supports relative to each other so that said test piece is subjected to a predetermined tension and the test piece will thus have a predetermined length, means for maintaining the test piece at a constant temperature, and means, responsive to successive relatively small values of creep of the test piece, adapted to automatically decrease the distance between said supports so as to maintain the length of the test piece constant and means for indicating the decrease in tension in said resilient means.

ARPAD NADAI.
JOHN BOYD.